(12) United States Patent
Sase et al.

(10) Patent No.: US 8,199,530 B2
(45) Date of Patent: Jun. 12, 2012

(54) POWER SUPPLY UNIT, HARD DISK DRIVE AND METHOD OF SWITCHING THE POWER SUPPLY UNIT

(75) Inventors: Takashi Sase, Hitachi (JP); Akihiko Kanouda, Hitachinaka (JP); Yosuke Tsuyuki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 485 days.

(21) Appl. No.: 12/544,135

(22) Filed: Aug. 19, 2009

(65) Prior Publication Data

US 2010/0232180 A1   Sep. 16, 2010

(30) Foreign Application Priority Data

Mar. 10, 2009   (JP) ................................. 2009-055872

(51) Int. Cl.
*H02M 3/335* (2006.01)
*H02M 3/24* (2006.01)

(52) U.S. Cl. .................... 363/17; 363/21.03; 363/21.06; 363/98

(58) Field of Classification Search ............... 363/16, 363/17, 21.02, 21.03, 21.06, 97, 98, 131, 363/132
See application file for complete search history.

(56) References Cited

U.S. PATENT DOCUMENTS

| | | | | |
|---|---|---|---|---|
| 6,781,853 | B2* | 8/2004 | Xu et al. | 363/21.06 |
| 7,362,598 | B2* | 4/2008 | Schaible et al. | 363/89 |
| 7,796,408 | B2* | 9/2010 | Wang et al. | 363/21.06 |
| 2011/0188269 | A1* | 8/2011 | Hosotani | 363/21.06 |

FOREIGN PATENT DOCUMENTS

| | | |
|---|---|---|
| JP | 2002-066739 A | 3/2002 |
| JP | 2004-260928 A | 9/2004 |

* cited by examiner

*Primary Examiner* — Matthew Nguyen

(74) *Attorney, Agent, or Firm* — Foley & Lardner LLP

(57) ABSTRACT

Zero volt switching during a light load is performed in such a manner that through an ON/OFF control of switches provided for a full bridge circuit and the synchronous rectifier switches in a rectifier and smoothing circuit, a resonant peak voltage necessary for the zero voltage switching determined by the output current flowing to output terminals, a resonant inductor and a resonant capacitor capacitance is ensured so that an energy accumulated in the rectifier and smoothing circuit is returned to the full bridge circuit so as to act as equivalent as when the output current is increased and to increase the current flowing through the full bridge circuit.

13 Claims, 9 Drawing Sheets

POWER SUPPLY UNIT, HARD DISK DRIVE AND METHOD OF SWITCHING THE POWER SUPPLY UNIT

CLAIM OF PRIORITY

The present application claims priority from Japanese patent application serial No. 2009-055872, filed on Mar. 10, 2009, the content of which is hereby incorporated by reference into this application.

FIELD OF THE INVENTION

The present invention relates to a power supply unit of an isolation type DC-DC converter and, in particular, concerns to an improvement of the efficiency during a light load thereof.

BACKGROUND OF THE INVENTION

From a view point of energy saving, a power supply unit of an isolation type DC-DC converter is required to have a high efficiency over a broad load range. Because of this, while using a power supply unit including a full bridge circuit at the primary side and a current doubler type rectifier and smoothing circuit at the secondary side, and applying thereto a soft switching technology that realizes a ZVS (Zero Volt Switching) by making use of a resonant inductor Lr and a resonant capacitor Cr in the full bridge circuit, a high efficiency thereof has been achieved. However, the power supply units of this type had a shortcoming in decreasing efficiency during a light load because the ZVS cannot be realized during such light load. The following examples are exemplified as conventionally known methods for solving this problem. Both intend to realize the ZVS with a method of increasing the value of the resonant inductor during a light load.

SUMMARY OF THE INVENTION

In Japanese Patent Publication No. 2004-260928, the ZVS is realized in such a manner that while providing in series with a resonant inductor Lr a parallel circuit of a second inductor and a switch and detecting a load state, and when a light load is detected, the switch is turned OFF and the value of the resonant inductor is enlarged in stepwise. However, with this method, circuit components have to be added to a power block that leads to a shortcoming in complicating the circuit.

Further, Japanese Patent Publication No. 2002-66739 relates to a method in which in order to continuously enlarging the value of the resonant inductor, a saturable reactor is used and the value of the resonant inductor is continuously varied by controlling linearly the saturable reactor depending on the load state. In such case, in addition to adding circuit components to the power block, a circuit for the linear control is to be added which further complicates the circuit structure and leads to a shortcoming in causing driving losses due to the linear control performed even during the light load.

The present invention has been invented in view of the above tasks and an object of the present invention is to intend an improvement in efficiencies during a light load of a power supply unit of an isolation type DC-DC converter by modifying the operation timing of synchronous rectifier switches at the secondary side without complicating the circuit for a power block.

In order to achieve the above object, a power supply unit according to the present invention including a transformer, a full bridge circuit provided for the primary side of said transformer, a rectifier and smoothing circuit with two synchronous rectifier switches provided for the secondary side of said transformer, output terminals provided for said rectifier and smoothing circuit, and a control means to which output states are input from said output terminals and which performs ON/OFF controls of switches provided for said full bridge circuit and the two synchronous rectifier switches in said rectifier and smoothing circuit, wherein with the presence of a resonant inductor constituted by a leakage inductor of said transformer and a parasitic inductor component of the wirings, and a resonant capacitor constituted by a parasitic capacitance of top and bottom arm switches at the side necessary for a resonant operation for performing ZVS in said full bridge circuit, the ZVS during a light load is performed in such a manner that through the ON/OFF control of the switches provided for said full bridge circuit and the two synchronous rectifier switches in said rectifier and smoothing circuit, a resonant peak voltage necessary for the ZVS determined by the output current flowing to said output terminals, said resonant inductor and said resonant capacitor is ensured so that an energy accumulated in said rectifier and smoothing circuit is returned to said full bridge circuit so as to act as equivalent as when said output current is increased and to increase the current flowing through said full bridge circuit.

With the power supply unit of the present invention, since the ZVS can be realized in a broad load range, an advantage of improving efficiencies during light loads can be achieved.

DESCRIPTION OF THE PREFERRED EMBODIMENTS

Embodiments of the present invention will be explained briefly.

A power supply unit of the present invention is a power supply unit of an isolation type DC-DC converter and is constituted by a transformer, a full bridge circuit disposed at the primary side of the transformer, a rectifier and smoothing circuit with two synchronous rectifier switches disposed at the secondary side of the transformer. During a light load, in an OFF period of the top and bottom arm switches at the side necessary for the resonant operation for the ZVS in the full bridge circuit, a period is provided in which both of the two synchronous rectifier switches are rendered to OFF. For this purpose, the ON period of the two synchronous rectifier switches is shortened and the OFF period thereof is prolonged, as well as the two synchronous rectifier switches keep the positional relationship unchanged between the rise timing of the switch at the side switching from OFF to ON among the top and bottom arm switches at the side necessary for the resonant operation for the ZVS in the full bridge circuit and the rise timing of the switch at the side switching from OFF to ON among the two synchronous rectifier switches. As a result, during the period when both of the two synchronous rectifier switches are OFF, in the synchronous rectifier switch at the side of switching from ON to OFF, the current flowing toward the synchronous rectifier switch is switched and flowed toward a body diode and both ends of the secondary coil of the transformer are rendered to a short circuited state with respect to its potential. Namely, either voltages at both ends of the secondary coil lower by a forward voltage drop of the body diode. Thereby, the energy accumulated in the parasitic capacitor in one of the synchronous rectifier switches being in OFF state is caused to flow in the secondary side of the transformer, of which energy is naturally transferred to the primary side of the transformer. In this manner, since the current in the primary side of the transformer can be increased, a reduction during a light load of a resonant peak voltage necessary for the ZVS that is determined by the resonant inductor, the resonant capacitor and a current dependent on the load is prevented and the value is raised to a predetermined level to realize the ZVS.

Further, in the power supply unit of the present invention, since the increasing amount of the current is modified depending on the load state, the increasing amount of the current is increased as the load becomes lighter. For this purpose, since the period when both two synchronous rectifier switches are OFF is enlarged as the load becomes lighter, the improvement in efficiencies is achieved over a broad load range.

Embodiment 1

Herein below, preferable embodiments of the present invention will be explained with reference to the drawings.

Figure 1:
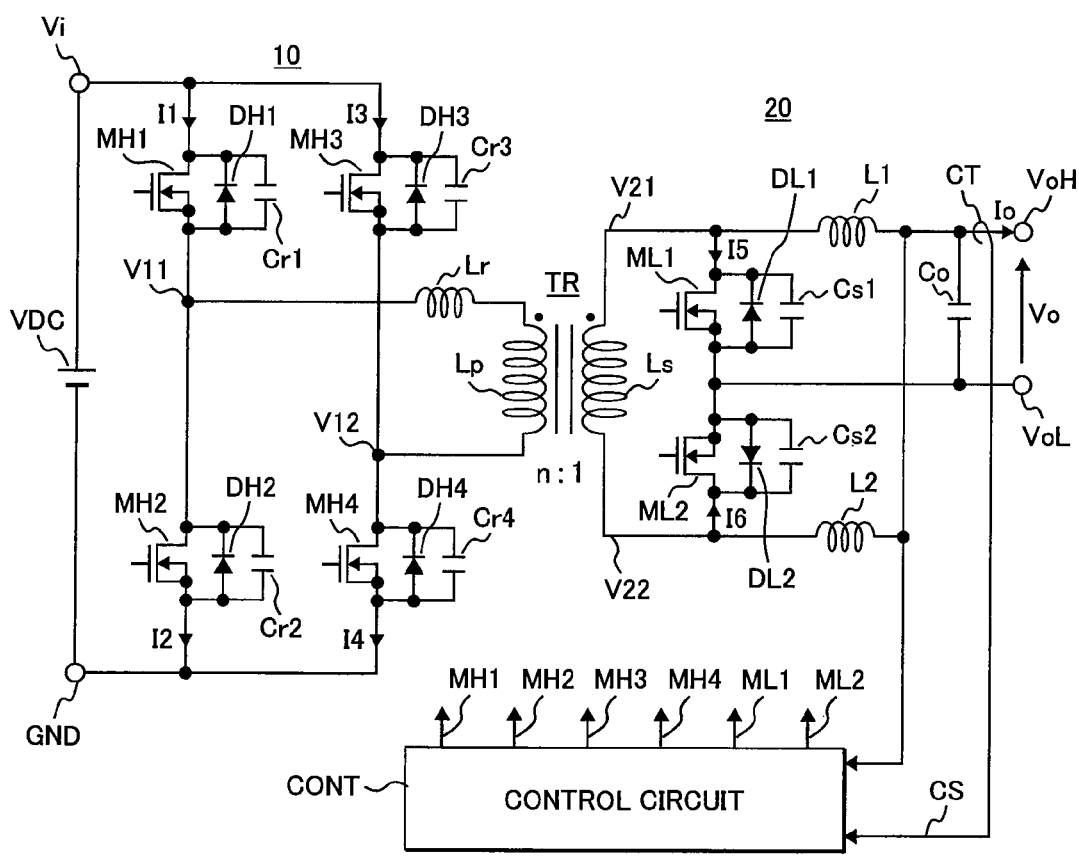
FIG. 1 is a circuit diagram of a power supply unit of embodiment 1.

FIG. 1 shows a first embodiment of a power supply unit of an isolation type DC-DC converter to which the present invention is applied. In the drawing, TR is a transformer, 10 is a full bridge circuit that AC drives a primary coil Lp in the transformer TR, 20 is a current doubler type rectifier and smoothing circuit that synchronously rectifies AC voltages induced at a secondary coil Ls in the transformer TR and converts the same into DC voltages and CONT is a control circuit that controls the operation timings of switch MOSFETs MH1~MH4 constituting the full bridge circuit 10 and synchronous rectifier switch MOSFETs ML1 and NL2 in the rectifier and smoothing circuit 20.

The full bridge circuit 10 is constituted by N channel MOSFETs MH1 and MH2, and MH3 and MH4 that are respectively connected in series between an input terminal Vi and a primary reference potential (ground potential) GND to which a DC voltage VDC is applied. Further, diodes DH1~DH4 and resonant capacitors Cr1~Cr4 that are connected in parallel with the respective switch MOSFETs MH1~MH4 are body diodes and parasitic capacitors incidental with the respective switch MOSFETs MH1~MH4.

The rectifier and smoothing circuit 20 is constituted by the synchronous rectifier switches ML1 and ML2, choke coils L1 and L2 and an output capacitor Co. Further, at the both ends of the output capacitor Co, output terminals VoH and VoL are connected to which a load (not shown) is to be connected. Still further, diodes DL1 and DL2 and capacitors Cs1 and Cs2 that are connected in parallel with the respective synchronous rectifier switch MOSFETs ML1 and ML2 are body diodes and parasitic capacitors incidental with the respective synchronous rectifier switch MOSFETs ML1 and ML2.

The control circuit CONT is inputted of sensed currents CS detected by a current transformer CT and of output voltages Vo obtained from between the output terminals VoH and VoL, and generates timing signals for controlling control signals for the switch MOSFETs MH1~MH4 with a phase shift PWM (Pulse Width Modulation) control system and also generates ON/OFF timing signals of control signals for the synchronous rectifier switch MOSFETs ML1 and ML2 based on signals from PWM of the switch MOSFETs MH1~MH4. Concretely, the timing waveforms for MH1~MH4 and ML11 and ML2 as shown in FIG. 2~FIG. 4 are illustrated.

Figure 2:
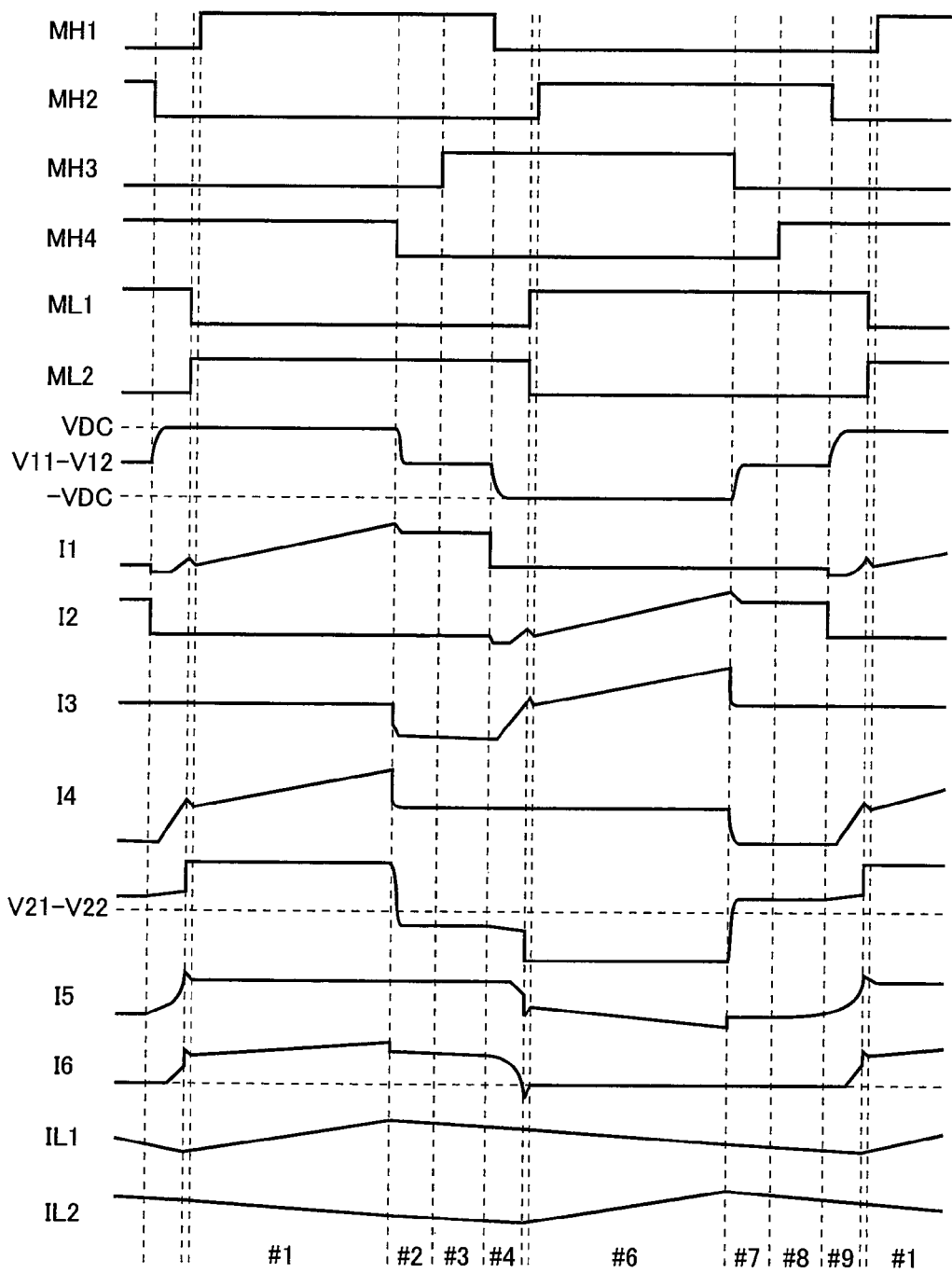
FIG. 2 is a timing chart of respective portions at (around) rated load of the power supply unit as shown in FIG. 1.
Figure 3:
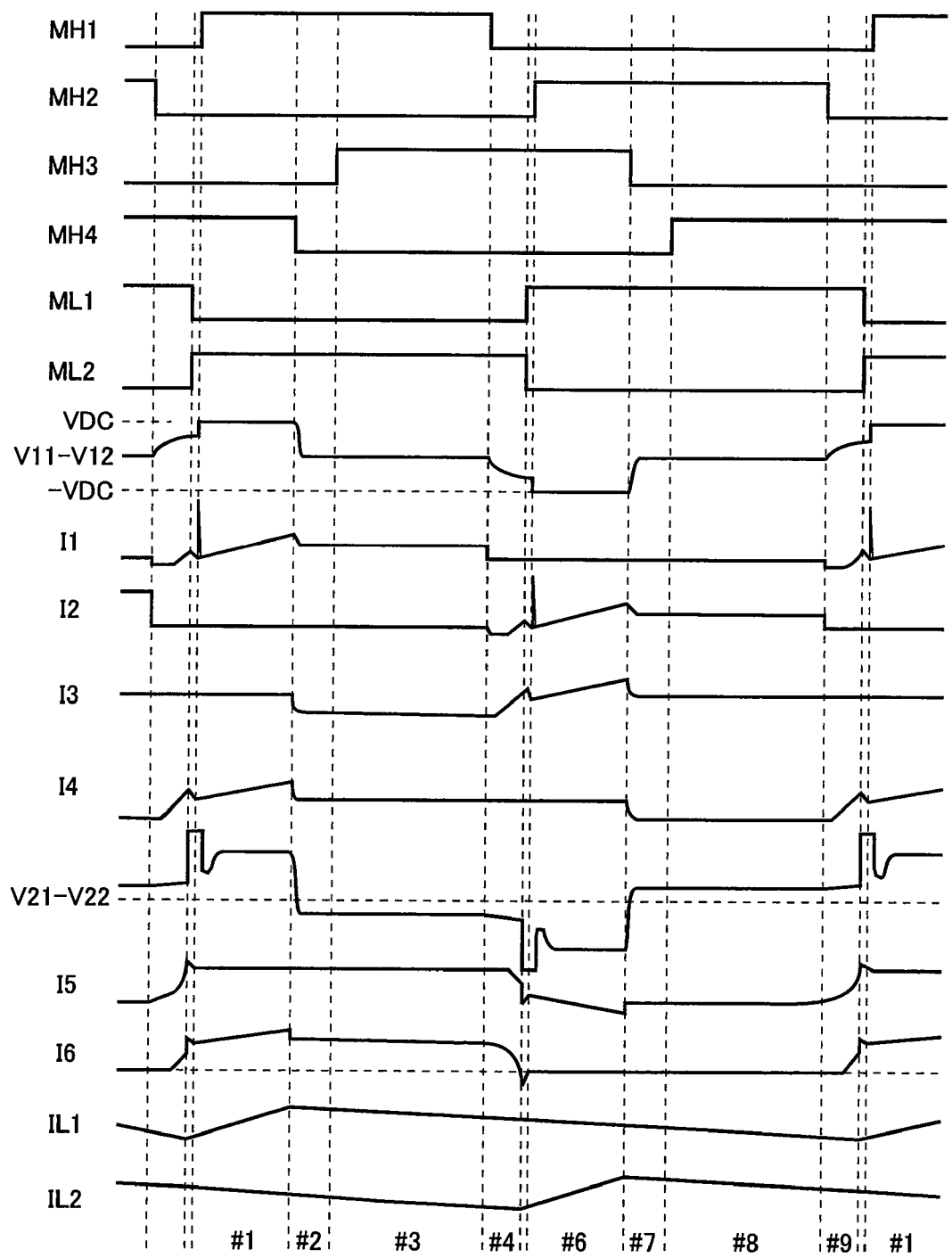
FIG. 3 is a timing chart of the respective portions when the ZVS cannot be realized during a light load of the power supply unit as shown in FIG. 1.
Figure 4:
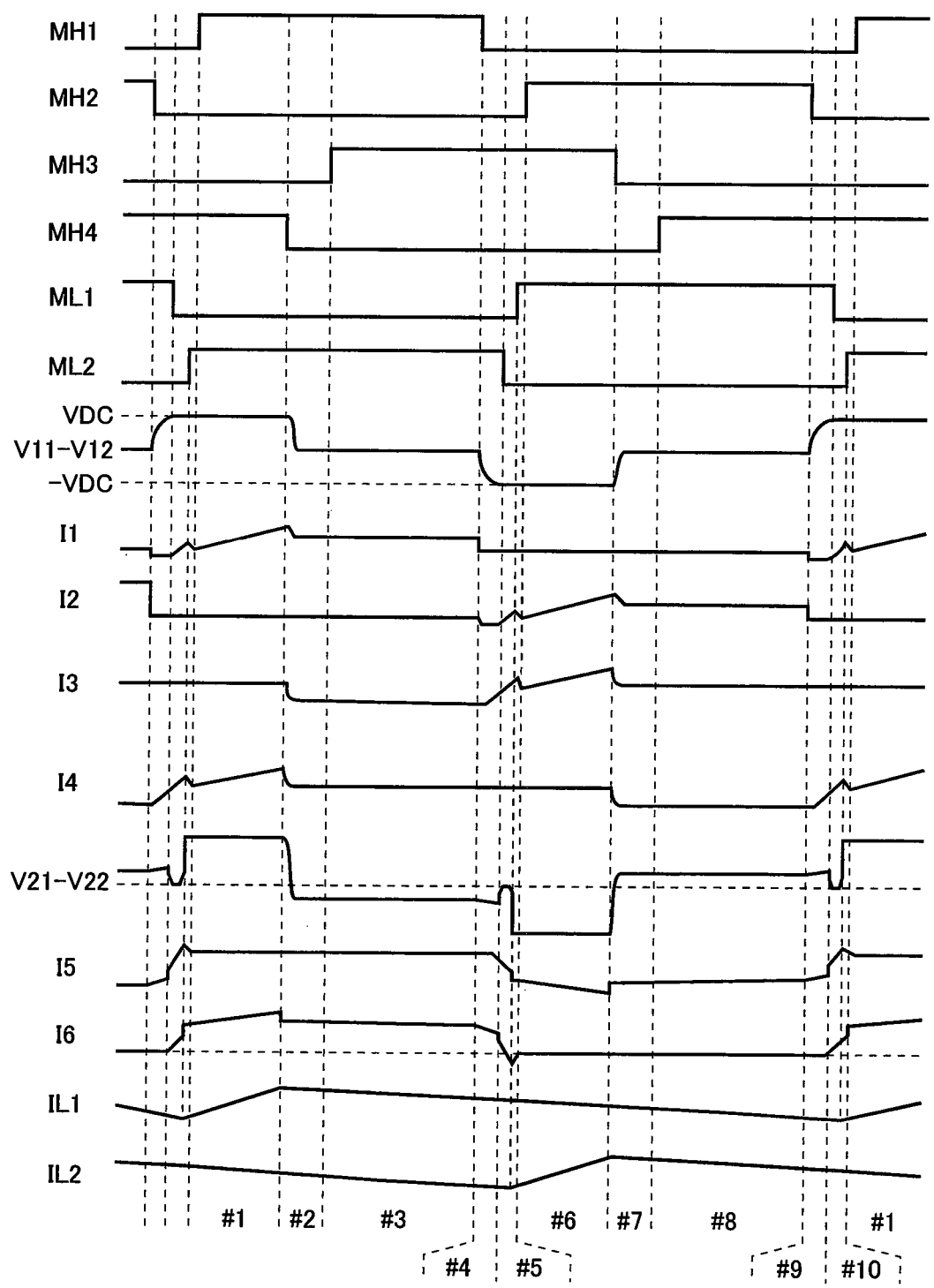
FIG. 4 is a timing chart of the respective portions when the ZVS can be realized during a light load of the power supply unit as shown in FIG. 1.

Now, an operation of the power supply unit of an isolation type DC-DC converter according to the present embodiment will be explained with reference to the timing charts as shown in FIG. 2~FIG. 4 and the equivalent circuit diagrams as shown in FIG. 5~FIG. 10. Further, FIG. 5~FIG. 10 show respective states of the full bridge circuit 10 and the rectifier and smoothing circuit 20 in respective periods #1~#6 as shown in FIG. 2~FIG. 4.

In FIG. 2~FIG. 4, control signals provided to the switch MOSFETs MH1~MH4 and ML1 and ML2 in FIG. 1 are shown in control signal waveforms as control signals MH1~MH4 and ML1 and ML2 and the instance when these control signal waveforms are High indicates ON and the instance Low indicates OFF. The respective control signals ML1 and ML2 use pulses of 50% duty and the two pulses operate in reversed phase. The rise timing of the control signal ML1 is set to turn ON slightly earlier than the rise timing of the control signal MH2 as well as the rise timing of the control signal ML2 is set to turn ON slightly earlier than the rise timing of the control signal MH1. Further, in the timings of the control signals of MH1 and MH2, and MH3 and MH4, the OFF periods are provided as a dead time in view of such as prevention of short circuiting and resonant operation time of the top and bottom arm switches. Herein, the switch MOSFETs MH1 and MH2 are the top and bottom arm switches at the side necessary for the resonant operation for the ZVS. Further, in the operating waveforms in FIG. 2~FIG. 4, for the sake of convenience of explanation, herein below, the timings such as the dead time and a part of the operating waveforms for a circuit simulations are shown in an exaggerated manner.

The switches shown by reference characters MH1~MH4 and ML1 and ML2 in FIG. 5~FIG. 10 correspond to MOSFETs MH1~MH4 and ML1 and ML2 in FIG. 1 and when the contacts of the switches MH1~MH4 and ML1 and ML2 are closed by solid lateral lines, such indicates that the concerned switch is in ON state. Further, reference characters Cr1~Cr4 and Cs1 and Cs2 show capacitors parasitizing the respective switch MOSFETs. Further, Lr represents such as a leakage inductor and a parasitic inductor component due to wirings of the transformer TR, V11 and V12; terminal voltages at the primary coil Lp, V21 and V22; terminal voltages at the secondary coil Ls, I1~I6; drain currents flowing respectively through MOSFETs MH1~MH4 and ML1 and ML2 and Io; an output (load) current. Ones indicated by dotted lines and arrows in the drawings are routes of current flows. In addition to the above explained reference characters, in FIG. 2~FIG. 4, the current flowing through the choke coils L1 and L2 are shown as IL1 and IL2.

At first, an operation under a (around) rated load state will be explained with reference to FIG. 2 timing chart and FIG. 5~FIG. 8 and FIG. 10 equivalent circuit diagrams.

Figure 5:
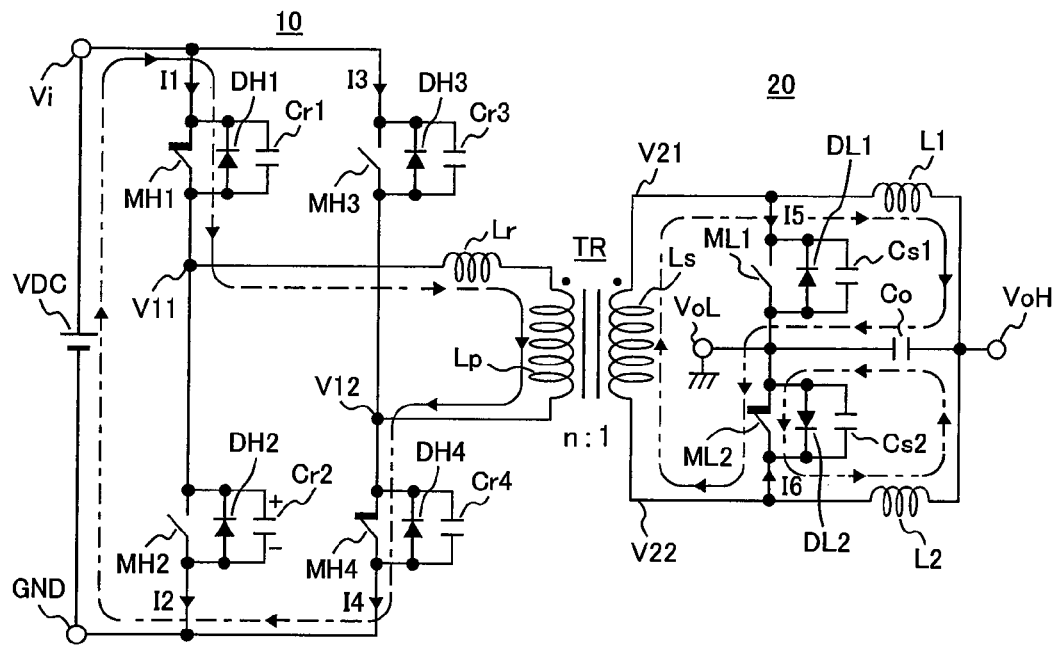
FIG. 5 is an equivalent circuit diagram showing the states of respective switches and currents flowing therethrough in embodiment 1 at a period #1 in FIG. 2~FIG. 4.

In period #1, as shown in FIG. 5, the switches MH1 and MH4 in the full bridge circuit 10 at the primary side are rendered to ON state and the switches MH2 and MH3 thereof are rendered to OFF state. Further, at this time, in the rectifier and smoothing circuit 20 at the secondary side the synchronous rectifier switch ML1 is rendered to OFF state and ML2 is rendered to ON state. Thereby, the DC voltage VDC is applied to the primary coil Lp of the transformer TR, a current is flowed through the primary coil Lp, a voltage is induced at the secondary coil Ls of the transformer TR in response to a turn ratio n and an electric power is transmitted from the primary side to the secondary side. Thus, since in the rectifier and smoothing circuit 20 at the secondary side the synchronous rectifier switch ML1 is in OFF state and ML2 is in ON state, a current is flowed from the choke coil L1 to a load (not shown) connected in parallel with the output capacitor Co and further toward the synchronous rectifier switch ML2 to thereby accumulate energy in the choke coil L1.

Figure 6:
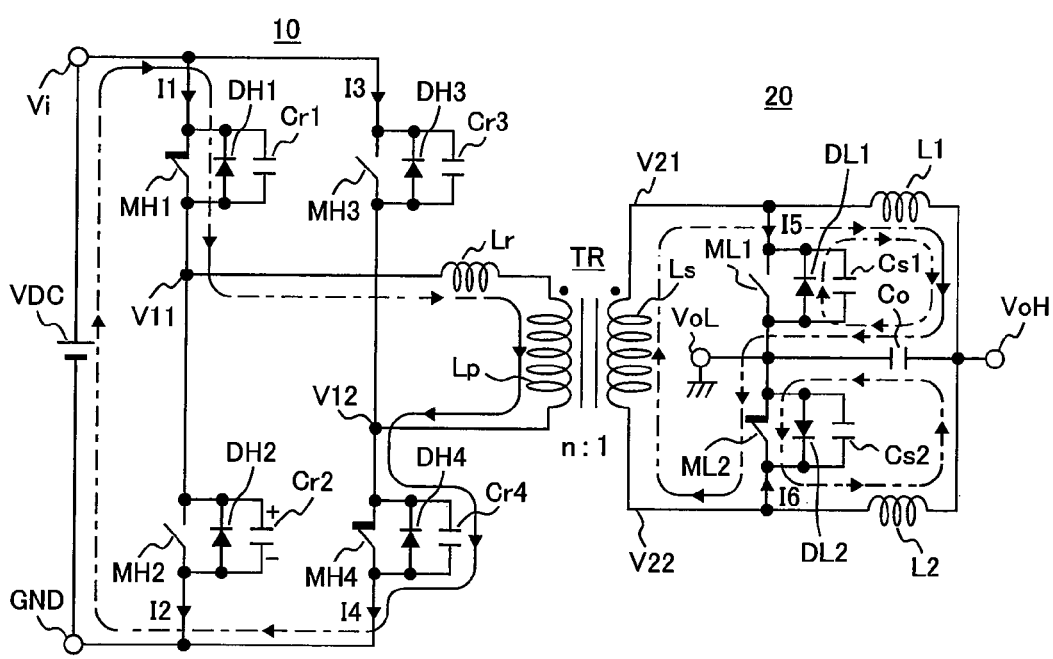
FIG. 6 is an equivalent circuit diagram showing the states of respective switches and currents flowing therethrough in embodiment 1 at a period #2 in FIG. 2~FIG. 4.

In period #2, as shown in FIG. 6, the switch MH1 in the full bridge circuit 10 at the primary side is rendered to ON state and the switches MH4, MH2 and MH3 thereof are rendered to OFF state. Further, at this time, in the rectifier and smoothing circuit 20 at the secondary side, like in the period #1, the synchronous rectifier switch ML1 is kept in OFF state and ML2 is kept in ON state. Thereby, even when the switch MH4 at the primary side is turned OFF, since a current tends to continuously flow through the primary coil Lp of the transformer TR, the current in the primary coil Lp flows toward the parasitic capacitor Cr4 to charge the same and the terminal voltage V12 of the primary coil Lp is raised. Further, in the rectifier and smoothing circuit 20 at the secondary side, the energy accumulated in the choke coil L1 is flowed toward the parasitic capacitor Cs1 of the synchronous rectifier switch ML1 to charge the same, and the voltage between both ends of the parasitic capacitor Cs1 gives the forward voltage drop Vd of the body diode DL1.

At this time, when the terminal voltage V12 of the primary coil Lp rises and reaches the DC voltage VDC, since the inter-terminal voltage (V11-V12) of the primary coil Lp changes from VDC to 0V, when switch MH3 is rendered to ON after the period #2, switch MH3 can be rendered to ON at the timing when the drain source voltage becomes 0V. Thereby, the switching loss of the switch MH3 can be minimized. In the period #2, although the time interval required when the inter-terminal voltage (V11-V12) of the primary coil Lp changes from VDC to 0V, namely, the time interval required when the terminal voltage V12 of the primary coil Lp rises up to the DC voltage VDC relates to the DC voltage VDC, the parasitic capacitor Cr4 of the switch MH4 and the load dependent current, because of the large value of the DC voltage VDC, the time interval always assumes constant time and is not affected by the load dependent current.

Figure 7:
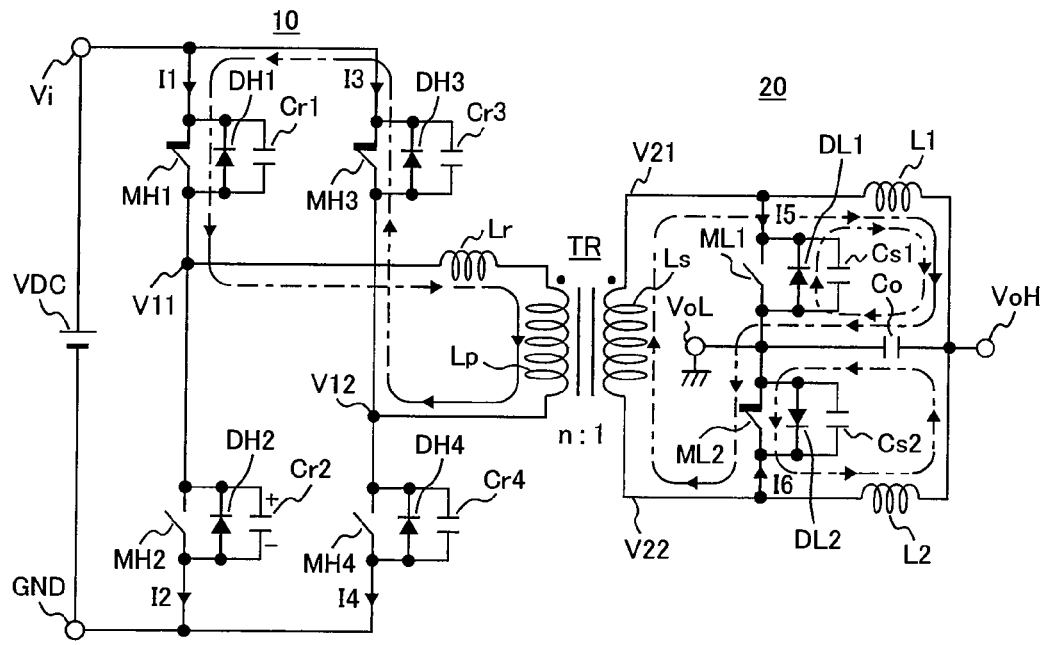
FIG. 7 is an equivalent circuit diagram showing the states of respective switches and currents flowing therethrough in embodiment 1 at a period #3 in FIG. 2~FIG. 4.

Then, in period #3, as shown in FIG. 7, the switches MH1 and MH3 in the full bridge circuit 10 at the primary side are rendered to ON state and the switches MH4 and MH2 thereof are rendered to OFF state. Further, at this time, in the rectifier and smoothing circuit 20 at the secondary side, like the period #2, the synchronous rectifier switch ML1 is kept in OFF state and ML2 is kept in ON state. Thereby, the primary coil Lp of the transformer TR is rendered to a short circuited state to assume an idling state where the current continues to flow as well as in the rectifier and smoothing circuit 20 at the secondary side, the energy accumulated in the secondary coil Ls and the choke coils L1 and L2 is discharged to the load (not shown) connected in parallel with the output capacitor Co and is consumed therein.

Figure 8:
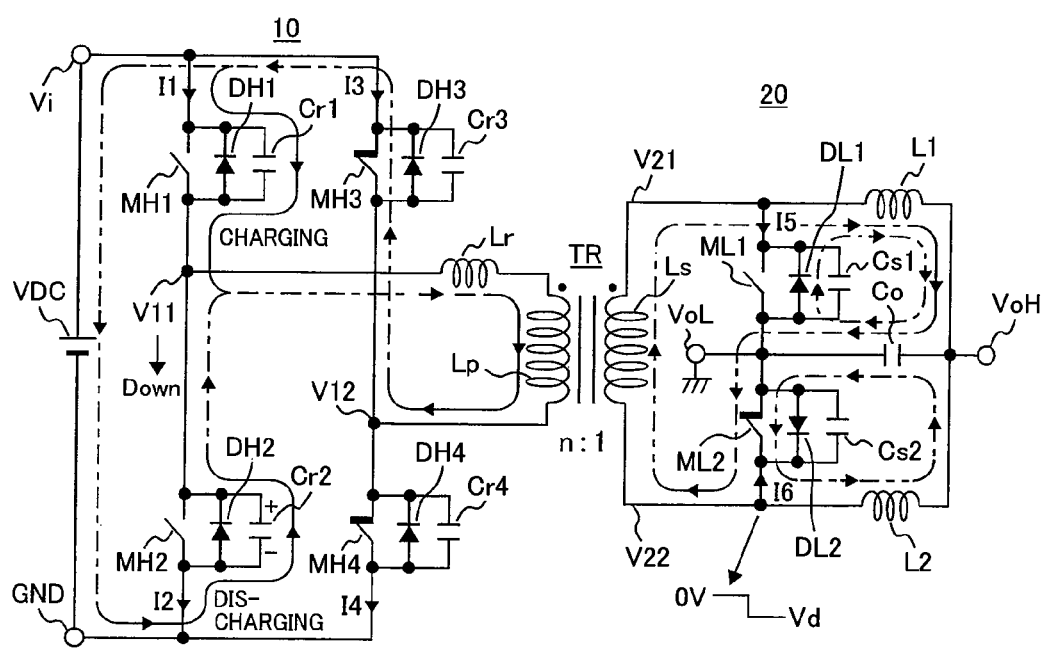
FIG. 8 is an equivalent circuit diagram showing the states of respective switches and currents flowing therethrough in embodiment 1 at a period #4 in FIG. 2~FIG. 4.

Then, in period #4, as shown in FIG. 8, the switches MH1, MH2 and MH4 in the full bridge circuit 10 at the primary side are rendered to OFF state and the switch MH3 thereof is rendered to ON state. Further, at this time, in the rectifier and smoothing circuit 20 at the secondary side, like the period #3, the synchronous rectifier switch ML1 is kept in OFF state and ML2 is kept in ON state. Resultantly, in the full bridge circuit 10 at the primary side, since the energy at the primary coil Lp flows to a route in which the parasitic capacitor Cr1 of the switch MH1 is charged up to the DC voltage VDC and to another route in which the energy accumulated in the parasitic capacitor Cr2 of the switch MH2 is discharged, the terminal voltage V11 of the primary coil Lp rapidly reduces. At this moment, since the parasitic capacitor Cr2 of the switch MH2 and the parasitic inductor Lr of the primary coil Lp constitute a series resonant circuit, the terminal voltage V11 of the primary coil Lp drops in a sine wave shape.

Herein, time tr required, when a resonant peak voltage (absolute value) of the series resonant circuit constituted by Cr and Lr that is necessary for the terminal voltage V11 of the primary coil Lp to drop in a sine wave shape reaches from VDC to a peak value (minimum value, for example, 0V), is expressed as follows, wherein Cr is assumed as Cr2;

$$tr = \{2\pi \times \sqrt{(Lr \times Cr)}\}/4 \quad (1)$$

Further, a resonant peak voltage Vpp is expressed as follows, wherein Io is an output (load) current, n is a turn ratio of the transformer TR;

$$Vpp = (Io/2)/n \times \{\sqrt{(Lr/Cr)}\} \quad (2)$$

It will be understood according to equation (1) that after turning OFF the switch MH1 in period #3, and when the switch MH2 is turned ON after the time tr, the switch MH2 can be turned ON at the timing when the drain source voltage of the switch MH2 becomes 0V.

In the present embodiment, the condition as expressed by the equation (1) is fulfilled in such a manner that after turning OFF the control signal for the switch MH1 and the time tr lapses, the control signal for the switch MH2 is raised. Since the switch MH2 is turned ON at the timing after the switch MH1 is turned OFF and after the time tr lapses, namely, at the timing when the drain source voltage of the switch MH2 becomes 0V from the DC voltage VDC, the loss in the switch MH2 can be minimized. In other words, it will be understood that because the ZVS due to resonant operation can be realized in this period the loss has been minimized.

Figure 10:
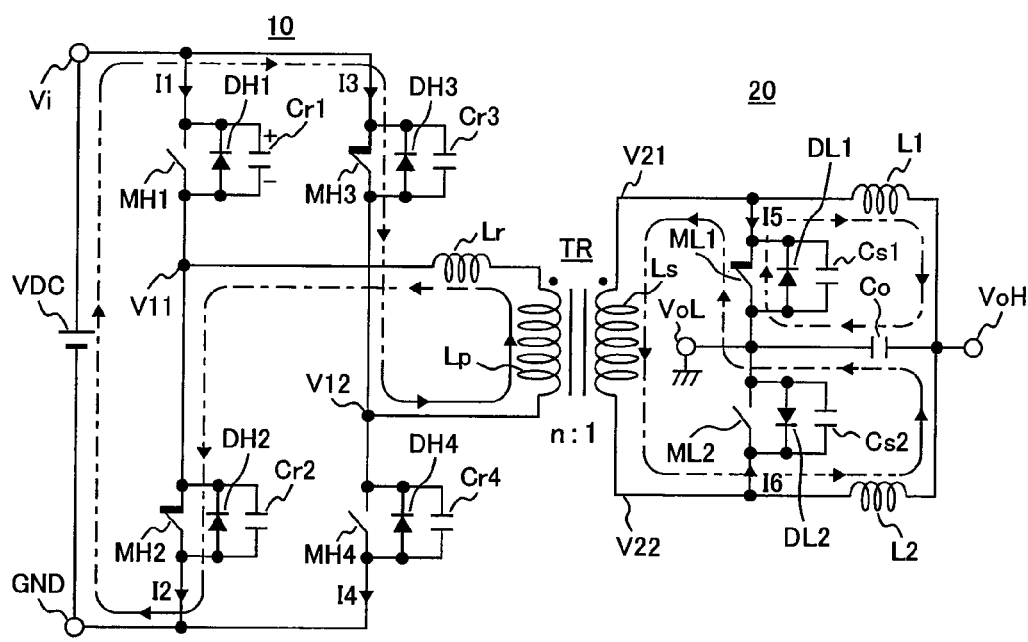
FIG. 10 is an equivalent circuit diagram showing the states of respective switches and currents flowing therethrough in embodiment 1 at a period #6 in FIG. 2~FIG. 4.

Then, in period #6, as shown in FIG. 10, the switches MH2 and MH3 in the full bridge circuit 10 at the primary side are rendered to ON state and the switches MH1 and MH4 thereof are rendered to OFF state. Further, at this time, in the rectifier and smoothing circuit 20 at the secondary side, immediately before entering into this period the synchronous rectifier switch ML1 is already rendered to ON state and ML2 is already rendered to OFF state. Thereby, since the directions of currents flowing through the primary coil Lp and the secondary coil Ls of the transformer TR are inverted respectively, DC voltage -VDC is applied to the inter-terminal voltage (V11-V12) of the primary coil Lp in the transformer TR, a current in opposite direction as in FIG. 5 is caused to flow through the primary coil Lp and an electric power is transmitted from the primary side to the secondary side. On one hand, in the rectifier and smoothing circuit 20 at the secondary side, since the synchronous rectifier switch ML1 is in ON state and ML2 is in OFF state, a current is flowed from the choke coil L2 to the load (not shown) connected in parallel with the output capacitor Co and further to the synchronous rectifier switch ML1 to accumulate energy in the choke coil L2.

Thereafter, in periods #7~#9, the controls are performed in the like sequences as those explained with reference to FIG. 6~FIG. 8 and FIG. 10. Namely, although the illustrations are omitted, in period #7, the switch MH2 in the full bridge circuit 10 at the primary side is rendered to ON state and the switches MH3, MH1 and MH4 thereof are rendered to OFF state. Further, at this moment, in the rectifier and smoothing circuit 20 at the secondary side, like period #6, the synchronous rectifier switch ML1 is kept in ON state and ML2 is kept in OFF state. Thereby, since the current tends to continuously flow through the primary coil Lp of the transformer TR even when the switch MH3 at the primary side is turned OFF, the current in the primary coil Lp flows toward the parasitic capacitor Cr3 of the switch MH3 to charge the same and the terminal voltage V12 of the primary coil Lp is reduced. Further, in the rectifier and smoothing circuit 20 at the secondary side, the energy accumulated in the choke coil L2 is flowed toward the parasitic capacitor Cs2 of the synchronous rectifier switch ML2 to charge the same, and the voltage between both ends of the parasitic capacitor Cs2 gives the forward voltage drop Vd of the body diode DL2.

At this moment, when the terminal voltage V12 of the primary coil Lp lowers and reaches the DC voltage −VDC, since the inter-terminal voltage (V11-V12) of the primary coil Lp changes from −VDC to 0V, when the switch MH4 is rendered to ON after the period #7, the switch MH4 can be rendered to ON at the timing when the drain source voltage becomes 0V. Thereby, the switching loss of the switch MH4 can be minimized. In the period #7, although the time interval required when the inter-terminal voltage (V11-V12) of the primary coil Lp changes from −VDC to 0V, namely, the time interval required when the terminal voltage V12 of the primary coil Lp lowers up to the DC voltage −VDC relates to the DC voltage VDC, the parasitic capacitor Cr3 of the switch MH3 and the load dependent current, because of the large value of the DC voltage VDC, the time interval always assumes constant time and, likely, is not affected by the load dependent current.

Then, in period #8, the switches MH2 and MH4 in the full bridge circuit 10 at the primary side are rendered to ON state and the switches MH3 and MH1 thereof are rendered to OFF state. Further, at this moment, in the rectifier and smoothing circuit 20 at the secondary side, like the period #7, the synchronous rectifier switch ML1 is kept in ON state and ML2 is kept in OFF state. Thereby, the primary coil Lp of the transformer TR is rendered to a short circuited state to assume an idling state where the current continues to flow as well as in the rectifier and smoothing circuit 20 at the secondary side, the energy accumulated in the secondary coil Ls and the choke coils L1 and L2 is discharged to the load (not shown) connected in parallel with the output capacitor Co and is consumed therein.

Then, in period #9, the switches MH2, MH3 and MH1 in the full bridge circuit 10 at the primary side are rendered to OFF state and the switch MH4 thereof is rendered to ON state. Further, at this moment, in the rectifier and smoothing circuit 20 at the secondary side, like the period #8, the synchronous rectifier switch ML1 is kept in ON state and ML2 is kept in OFF state. Resultantly, in the full bridge circuit 10 at the primary side, since the energy at the primary coil Lp flows to a route in which the parasitic capacitor Cr2 of the switch MH2 is charged up to the DC voltage VDC and to another route in which the energy accumulated in the parasitic capacitor Cr1 of the switch MH1 is discharged, the terminal voltage V11 of the primary coil Lp rapidly rises. At this moment, since the parasitic capacitor Cr1 of the switch MH1 and the parasitic inductor Lr of the primary coil Lp constitute a series resonant circuit, the terminal voltage V11 of the primary coil Lp rises in a sinusoidal wave shape. Then, after turning OFF the switch MH2 so as to fulfill the condition as expressed by the equation (1), since the switch MH1 is turned ON at the timing after the switch MH1 is turned OFF at the timing after when the drain source voltage of the switch MH1 becomes 0V from the DC voltage VDC, the loss in the switch MH1 can be minimized. In other words, it will be understood that because the ZVS due to resonant operation can be realized in this period the loss has been minimized. Then, the sequence returns to period #1 to repeat the same.

Now, an operation during a light load state will be explained. In the operation above, it has been explained that the ZVS due to the resonant operation can be realized in period #4 and the loss in switch MH2 can be minimized, however, this is because the operation is performed at a (around) rated load and the resonant peak voltage Vpp reaches the DC voltage VDC as will be seen from equation (2). However, during a light load operation, since the load current Io decreases, Io in equation (2) is limited and resultantly, the resonant peak voltage Vpp does not reach the DC voltage VDC. For this reason, when the switch MH2 is turned ON under a condition that the terminal voltage V11 of the primary coil Lp does not reach the peak value (minimum value, for example, 0V), since the switch MH2 is turned ON before the drain source voltage becomes 0V, a loss in the switch MH2 is generated. Further, since the output current Io becomes smaller as the load becomes lighter, the magnitude of the resonant peak voltage Vpp is hard to reach the DC voltage VDC. Accordingly, when the switch MH2 is turned ON at this moment, the ZVS cannot be realized and the loss increases.

This fact is illustrated in FIG. 3 timing chart. A point to be noted is the instance where with respect to the inter-terminal voltage (V11-V12) of the primary coil Lp the resonant peak voltage Vpp does not reach the DC voltage −VDC in period #4. When the switch MH2 is turned ON at this timing, a spike current overlaps on the drain current I2 of the switch MH2 and a switching loss is caused. Further, at the inter-terminal voltage (V21-V22) of the secondary coil Ls although which is an operational waveform obtained by a circuit simulation, since at the timing when turning ON the synchronous rectifier switch ML1 and turning OFF ML2, an excessive voltage that exceeds the breakdown voltage of the body diode DL2 in the synchronous rectifier switch ML2 is induced at the terminal V22 of the secondary coil Ls, it happen that breakdown is engendered in the body diode DL2 and a loss is caused.

A reason why such losses as above are caused during light loads is that the ZVS cannot be realized in period #4, and in order to realize the ZVS, the operation timing for the synchronous rectifier switches ML1 and ML2 at the secondary side should be changed as shown in FIG. 4. Namely, ON period of pulses for the synchronous rectifier switches ML1 and ML2 is shortened and the OFF period thereof is prolonged as well as pulses are used that do not change the positional relationship between the rise timing of the switch MH2 at the side being switched from OFF to ON among the top and bottom arm switches MH1 and MH2 at the side necessary of the resonant operation for the ZVS of the full bridge circuit 10 and the rise timing of the switch ML1 at the side being switched from OFF to ON among the two synchronous rectifier switches ML1 and ML2 in period #4 as shown in FIG. 3. Herein below, an operation (state) for realizing the ZVS by making use of period #5 newly introduced in the present embodiment as shown in FIG. 4 will be explained with reference to the equivalent circuit diagram as shown in FIG. 9.

Period #5 is a latter half after dividing the period #4 as shown in FIG. 3 into two periods as shown in FIG. 4 and the former half period is denoted as #4 as before. Therefore, ON/OFF state of the switches MH1~MH4, ML1 and ML2 in period #4 in FIG. 4 is as same as before. Namely, in this period, the switches MH1, MH2 and MH4 in the full bridge circuit 10 at the primary side are rendered to OFF state and the switch MH3 thereof is rendered to ON state. Further, at this time, in the rectifier and smoothing circuit 20 at the secondary side, the synchronous rectifier switch ML1 is rendered to OFF state and ML2 is rendered to ON state.

Figure 9:
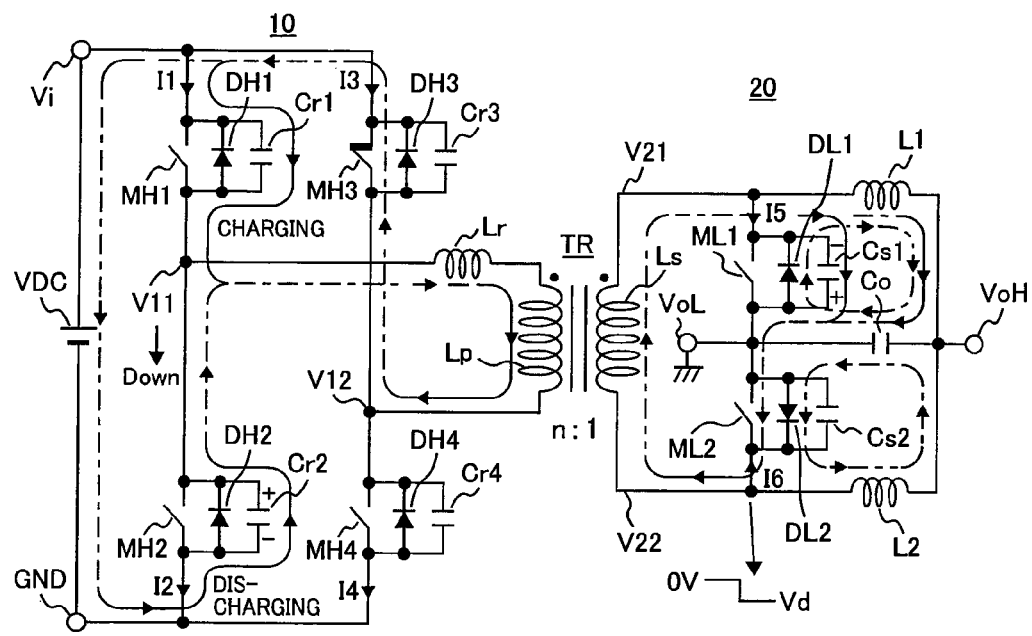
FIG. 9 is an equivalent circuit diagram showing the states of respective switches and currents flowing therethrough in embodiment 1 at a period #5 in FIG. 4.

In the subsequent period #5, as shown in FIG. 9, like period #4, the switches MH1, MH2 and MH4 in the full bridge circuit 10 at the primary side are rendered to OFF state and the switch MH3 thereof is rendered to ON state. Further, at this time, in the rectifier and smoothing circuit 20 at the secondary side, both of the synchronous rectifier switches ML1 and ML2 are rendered to OFF state. Thereby, since the current flowing through the synchronous rectifier switch ML2 is switched to the body diode DL2, the voltage at the terminal voltage V22 of the secondary coil Ls lowers from the ON voltage (near 0V) of the synchronous rectifier switch ML2 by the forward voltage drop Vd of the body diode DL2. At this moment, since the voltage at the other terminal voltage V21 of the secondary coil Ls likely lowers by the forward voltage drop Vd of the body diode DL1, the inter-terminal voltage (V21-V22) of the secondary coil Ls becomes 0V (a short circuited state with regard to potential). Resultantly, the energy accumulated in the parasitic capacitor Cs1 of the synchronous rectifier switch ML1 is flowed to the secondary coil Ls via the body diode DL2, which is transmitted to the primary coil Lp. This energy transmitted to the primary coil Lp promotes charging of the parasitic capacitor Cr1 of the switch MH1 (or discharging of the parasitic capacitor Cr2 of the switch MH2) to lower the terminal voltage V11 of the primary coil Lp to 0V in a sine wave shape state. Namely, since the energy transmitted to the primary coil Lp works to increase the current in the circuit of primary side, which corresponds to Io/n in equation (2), the resonant peak voltage is forced to the DC voltage VDC to realize the ZVS during the light load state.

Further, the period #9 as shown in FIG. 3 is divided into period #9 and period #10 as shown in FIG. 4 and in period #10, like period #9, the switches MH2, MH3 and MH1 in the full bridge circuit 10 at the primary side are rendered to OFF state and the switch MH4 thereof is rendered to ON state. Further, at this time, in the rectifier and smoothing circuit 20 at the secondary side, both of the synchronous rectifier switches ML1 and ML2 are rendered to OFF state. Thereby, since the current flowing through the synchronous rectifier switch ML1 is switched to the body diode DL1, the voltage at the terminal voltage V21 of the secondary coil Ls lowers from the ON voltage (near 0V) of the synchronous rectifier switch ML1 by the forward voltage drop Vd of the body diode DL1. At this moment, since the voltage at the other terminal voltage V22 of the secondary coil Ls likely lowers by the forward voltage drop Vd of the body diode DL2, the inter-terminal voltage (V21-V22) of the secondary coil Ls becomes 0V (a short circuited state with regard to potential). Resultantly, the energy accumulated in the parasitic capacitor Cs2 of the synchronous rectifier switch ML2 is flowed to the secondary coil Ls via the body diode DL1, which is transmitted to the primary coil Lp. This energy transmitted to the primary coil Lp promotes charging of the parasitic capacitor Cr2 of the switch MH2 (or discharging of the parasitic capacitor Cr1 of the switch MH1) to raise the terminal voltage V11 of the primary coil Lp to 0V in a sine wave shape state to thereby realize the ZVS.

Incidentally, the total time of the periods #4 and #5 at 100 kHz is about 0.5 μsec.

In this method, the load state is detected, and when a light load is detected, since an OFF state (OFF period) of both synchronous rectifier switches ML1 and ML2 is introduced during an OFF state (OFF period) of the switches MH1 and MH2 of the full bridge circuit 10 at the primary side, the current flowing through the circuit at the primary side can be increased to thereby realize the ZVS.

Further, as the load becomes lighter, since the OFF period of both synchronous rectifier switches ML1 and ML2 is enlarged in the OFF period of the switches MH1 and MH2 of the full bridge circuit 10 at the primary side, a further current increase in the circuit at the primary side can be achieved to thereby realize the ZVS over a broad load range.

Herein, as the top and bottom arm switches at the side necessary of the resonant operation for the ZVS of the full bridge circuit 10 at the primary side, the switches MH1 and MH2 are mentioned, which correspond to the top and bottom arm switches at the side being controlled in a lag phase in the full bridge circuit 10 from a viewpoint of the phases in a phase shift PWM control system.

With regard to the operation timings of the switches MH1~MH4, ML1 and ML2, in the present embodiment, the load current is detected by making use of the current transformer CT and what is detected is fed to the control circuit CONT, and the control circuit CONT generates the timing signals as shown in FIG. 2 when the load is at a (around) rated load and the timing signals as shown in FIG. 4 when the load is a light load other than the (around) rated load. However, as a method of detecting a load current, in place of the current transformer CT, the load current can be detected in a form of a voltage proportional to the load current by making use of a sense resistance.

Further, although the OFF period of both synchronous rectifier switches ML1 and ML2 corresponding to the period #5 is set depending on only the information of the load current, since the amount of current in the circuit at the primary side varies even depending on variation of the DC voltage VDC, the ZVS can be realized by adding the information of the DC voltage VDC. For this purpose, although not illustrated, a measure can be taken in which a voltage obtained by dividing the DC voltage VDC is fed to the control circuit CONT.

Further, since the operation timings of the switches MH1~MH4, ML1 and ML2 generated in the control circuit CONT vary depending on the load state, a fine computation is required for the generation of the operation timings. For this purpose, it is desirable to perform a computation based on digital control as well as a computation based on analog control as a matter of course.

In the above embodiment, although the rise timing of the control signal ML1 as shown in FIG. 2~FIG. 4 is set to turn ON slightly earlier than the rise timing of the control signal MH2 and likely the rise timing of the control signal ML2 is set to turn ON slightly earlier than the rise timing of the control signal MH1, even when the rise timing of the control signal ML1 is set to turn ON at the same timing as the rise timing of the control signal MH2 and likely the rise timing of the control signal ML2 is set to turn ON at the same time as the rise timing of the control signal MH1, the ZVS can be realized likely.

Further, depending on some instances, even when the rise timing of the control signal ML1 is set to turn ON slightly later than the rise timing of the control signal MH2 and likely the rise timing of the control signal ML2 is set to turn ON slightly later than the rise timing of the control signal MH1, the ZVS can be realized likely.

In the present embodiment, although an instance is explained where the switches MH1~MH4 are MOSFETs (Metal Oxide Semiconductor Field Effect Transistor), IGBT (Isolated Gate Bipolar Transistor), BJT (Bipolar Junction Transistor) or other suitable transistors can be used therefor.

In this way, with the present embodiment, since the ZVS can be realized over a broad load range, an advantage of improving efficiency in light loads, in particular, in a range of 20%~50% of rated load can be achieved. Further, since the improvement in efficiency during light loads can be effected only by altering the operation timings of the two synchronous rectifier switches at the secondary side, an increase of circuit components for a power block can be eliminated. Further, because of the unnecessity of increasing the circuit components for the power block, an advantage is obtained that a cost increase of the power supply unit is prevented for the light load countermeasure.

Embodiment 2

Figure 11:
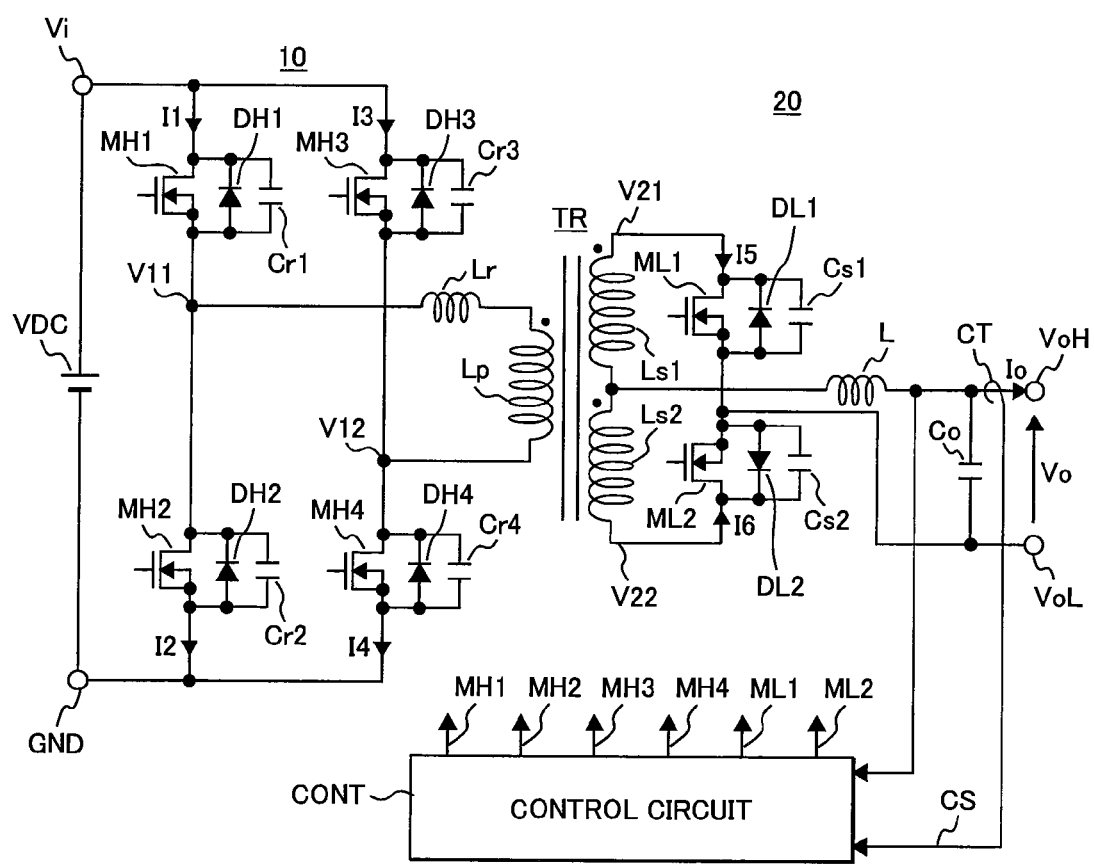
FIG. 11 is a circuit diagram of a power supply unit of embodiment 2.

The second embodiment is shown in FIG. 11. In FIG. 11, the same constitutional elements as those in FIG. 1 are denoted by the same reference characters. A different point of FIG. 11 from FIG. 1 is that the secondary coil of the transformer TR is changed to coils Ls1 and Ls2 with a tap. For this reason, in the rectifier and smoothing circuit 20, the synchronous rectifier switch ML1 and ML2 are connected in series between both terminals of the secondary coil, and the center tap of the secondary coil is connected via a choke coil L to one terminal of the output capacitor Co. Further, the other terminal of the output capacitor Co is connected to a midpoint of the synchronous rectifier switch ML1 and ML2. In the present embodiment, likely, by detecting such as the load states and the DC voltage state at the primary side, the control circuit CONT generates the operation timing signals for the switches MH1~MH4, ML1 and ML2 as shown in FIG. 2 when the load is at a (around) rated load and as shown in FIG. 4 when the load is a light load other than the (around) rated load, thereby, likely as in FIG. 1, the ZVS can be realized over a broad load range and an advantage of improving efficiency during light loads can be obtained.

As will be apparent from the above, with the present embodiment, likely, since the ZVS can be realized over a broad load range, an advantage of improving efficiency in light loads, in particular, in a range of 20%~50% of rated load can be achieved. Further, since the improvement in efficiency during light loads can be effected only by altering the operation timings of the two synchronous rectifier switches at the secondary side, an increase of circuit components for a power block can be eliminated. Further, because of the unnecessity of increasing the circuit components for the power block, an advantage is obtained that a cost increase of the power supply unit is prevented for the light load countermeasure.

Embodiment 3

Figure 12:
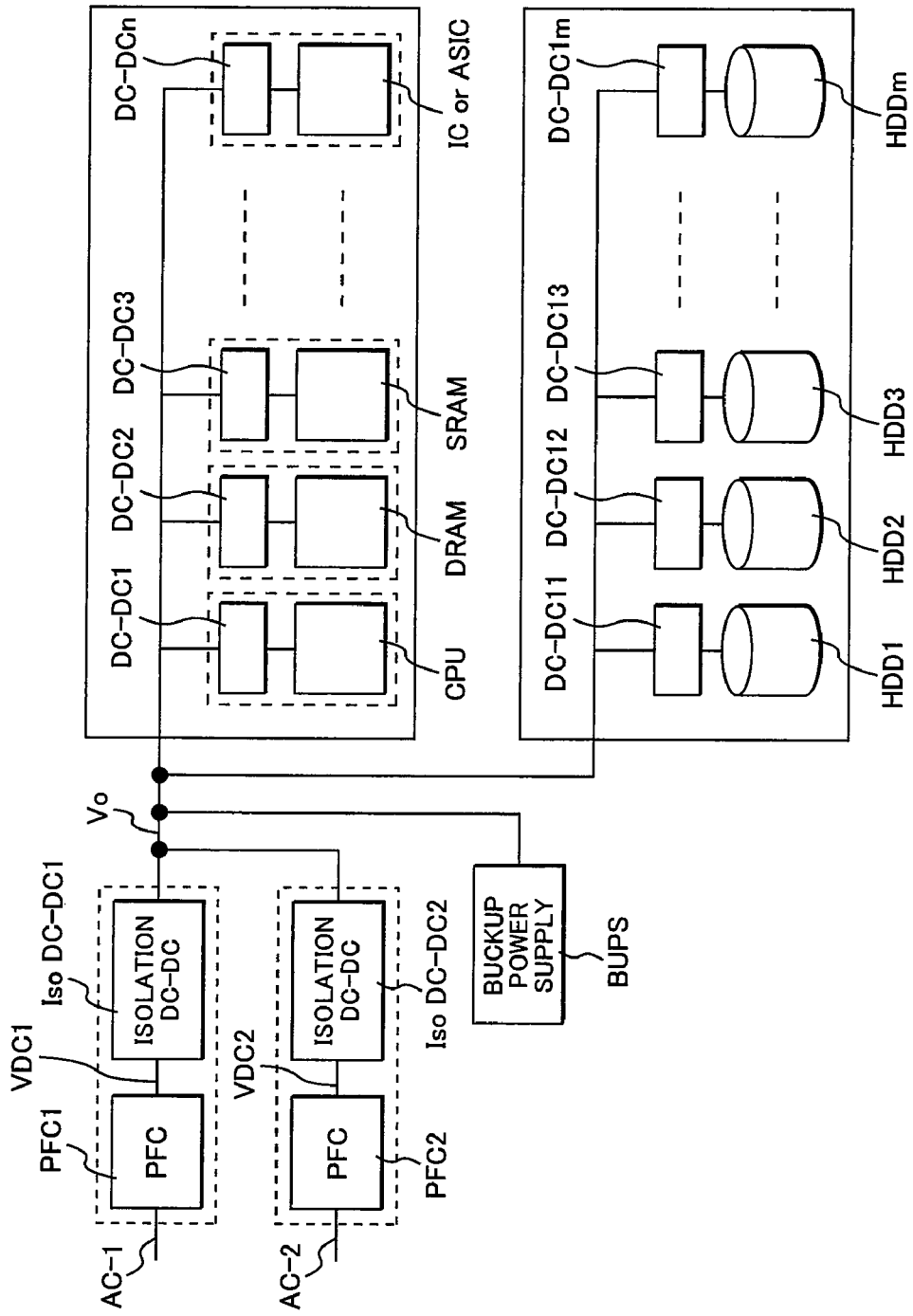
FIG. 12 is a diagram for explaining a power supply unit used for an HDD of embodiment 3.

The present embodiment is shown in FIG. 12. FIG. 12 is an embodiment in which the present invention is applied to an HDD (Hard Disk Drive). A power supply system in an HDD constitutes a power supply system of parallel redundant structure that receives AC voltage and outputs an output voltage Vo via PEC (Power Factor Correction) circuits PFC1 and PFC2 and isolation type DC-DC converters Iso DC-DC1 and Iso DC-DC2 that are the power supply units as explained in the embodiment 1 or 2. To the output voltage Vo a backup power supply BUPS mounting a battery is connected as a power outage measure. Further, the output voltage Vo supplies an electric power to the HDDs HDD1~DHHn via nonisolation type DC-DC converters DC-DC11~DC-DC1m as well as supplies electric powers of different voltages suitable for respective objects via nonisolation type DC-DC converters DC-DC1~DC-DCn to a board constituted by such as a processor administering control for storing data in the HDDs and high speed large capacity memories DRAM and SRAM.

According to the power supply system and device of the present embodiment that use the power supply unit as explained in connection with embodiments 1 and 2, the ZVS can be realized over a broad load range, a power supply system and device can be obtained which can enhance the efficiency in response to a variety of loads.

Although the control system of the present invention is applied to an isolation type DC-DC converter including a full bridge circuit at the primary side and a rectifier and smoothing circuit using synchronous rectifier switches at the secondary side, other than the above application, the control system of the present invention can also be applicable to a system using an isolation type DC-DC converter utilizing the resonant operation.

Other than the above, although not illustrated, it is needless to say that the power supply unit as explained in connection with the embodiments 1 and 2 can be applied and developed such as to a power supply unit for a variety of industrial application equipments, a power supply unit for information and communication equipments and a general-purpose isolation type DC-DC converter.

What is claimed is:

1. A power supply unit including:
   a transformer,
   a full bridge circuit provided for the primary side of said transformer,
   a rectifier and smoothing circuit with two synchronous rectifier switches provided for the secondary side of said transformer,
   output terminals provided for said rectifier and smoothing circuit, and
   a control means to which output states are input from said output terminals and which performs ON/OFF controls of switches provided for said full bridge circuit and the two synchronous rectifier switches in said rectifier and smoothing circuit,
   wherein a resonant inductor constituted by a leakage inductor of said transformer and a parasitic inductor component of wirings, and a resonant capacitor constituted by a parasitic capacitance of top and bottom arm switches at the side necessary for a resonant operation for performing zero volt switching in said full bridge circuit are included,
   wherein the zero volt switching during a light load is performed in such a manner that through the ON/OFF control of the switches provided for said full bridge circuit and the two synchronous rectifier switches in said rectifier and smoothing circuit, a resonant peak voltage necessary for the zero voltage switching determined by the output current flowing to said output terminals, said resonant inductor and said resonant capacitor is ensured so that an energy accumulated in said rectifier and smoothing circuit is returned to said full bridge circuit so as to act as equivalent as when said output current is increased and to increase the current flowing through said full bridge circuit.

2. The power supply unit according to claim 1, wherein in order to increase the current flowing through said full bridge circuit, in the OFF period of the top and bottom arm switches at the side necessary of the resonant operation for the zero volt switching of said full bridge circuit, both OFF periods of said two synchronous rectifier switches are provided.

3. The power supply unit according to claim 2, wherein both OFF periods of said two synchronous rectifier switches are provided in such a manner that ON period of said two synchronous rectifier switches is shortened and the OFF period thereof is prolonged, and the positional relationship between the rise timing of the switch at the side being switched from OFF to ON among the switches in the top and bottom arm switches at the side necessary of the resonant operation for the zero volt switching of said full bridge circuit and the rise timing of the switch at the side being switched from OFF to ON among the two synchronous rectifier switches is kept unchanged.

4. The power supply unit according to claim 1, wherein in order to vary an increasing amount of current depending on the load state, the increasing amount of current flowing through said full bridge circuit is increased as the load becomes lighter.

5. The power supply unit according to claim 4, wherein in order to increase the increasing amount of current flowing through said full bridge circuit, both OFF periods of said two synchronous rectifier switches is broadened as the load becomes lighter.

6. The power supply unit according to claim 1, wherein in order to increase the increasing amount of current flowing through said full bridge circuit, in addition to an information on the load state, an information on DC input voltage variation at the primary side is added.

7. The power supply unit according to claim 2, wherein the generation of timing signals for the switches in said full bridge circuit and said two synchronous rectifier switches is performed through a digital control.

8. The power supply unit according to claim 1, wherein the rectifier and smoothing circuit including the two synchronous rectifier switches provided at the secondary side of said transformer is constituted by a current doubler system circuit.

9. The power supply unit according to claim 1, wherein the rectifier and smoothing circuit including the two synchronous rectifier switches provided at the secondary side of said transformer is constituted by a rectifier and smoothing circuit in which the secondary coil of said transformer is provided with a center tap.

10. The power supply unit according to claim 1, wherein between said transformer and said full bridge circuit another resonant inductor is provided.

11. The power supply unit according to claim 1, wherein the energy returned to said full bridge circuit during a light load state is the energy accumulated in the parasitic capacitor of the synchronous rectifier switches in said rectifier and smoothing circuit.

12. A hard disk drive including a magnetic recording disk, a magnetic head, a magnetic disk rotation drive unit, a magnetic head drive unit, a magnetic head position control unit, an input and output signal control unit and a power supply unit for supplying an electric power thereto, wherein among an AC-DC converter representing the power supply unit that outputs a DC voltage from an AC voltage, a power supply unit of an isolation type DC-DC converter that receives an output voltage from a PFC circuit and outputs a DC voltage including a transformer, a full bridge circuit provided for the primary side of said transformer, a rectifier and smoothing circuit with two synchronous rectifier switches provided for the secondary side of said transformer, output terminals provided for said rectifier and smoothing circuit, and a control means to which output states are input from said output terminals and which performs ON/OFF controls of switches provided for said full bridge circuit and the two synchronous rectifier switches in said rectifier and smoothing circuit, wherein a resonant inductor constituted by a leakage inductor of said transformer and a parasitic inductor component of wirings, and a resonant capacitor constituted by a parasitic capacitance of top and bottom arm switches at the side necessary for a resonant operation for performing zero volt switching in said full bridge circuit are included, wherein the zero volt switching during a light load is performed in such a manner that through the ON/OFF control of the switches provided for said full bridge circuit and the two synchronous rectifier switches in said rectifier and smoothing circuit, a resonant peak voltage necessary for the zero voltage switching determined by the output current flowing to said output terminals, said resonant inductor and said resonant capacitor is ensured so that an energy accumulated in said rectifier and smoothing circuit is returned to said full bridge circuit so as to act as equivalent as when said output current is increased and to increase the current flowing through said full bridge circuit.

13. A method of switching a power supply unit including:

a transformer, a full bridge circuit provided for the primary side of said transformer, a rectifier and smoothing circuit with two synchronous rectifier switches provided for the secondary side of said transformer, output terminals provided for said rectifier and smoothing circuit, and a control means to which output states are input from said output terminals and which performs ON/OFF controls of switches provided for said full bridge circuit and the two synchronous rectifier switches in said rectifier and smoothing circuit, wherein a resonant inductor constituted by a leakage inductor of said transformer and a parasitic inductor component of wirings, and a resonant capacitor constituted by a parasitic capacitance of top and bottom arm switches at the side necessary for a resonant operation for performing zero volt switching in said full bridge circuit are included, wherein the zero volt switching during a light load is performed in such a manner that through the ON/OFF control of the switches provided for said full bridge circuit and the two synchronous rectifier switches in said rectifier and smoothing circuit, a resonant peak voltage necessary for the zero voltage switching determined by the output current flowing to said output terminals, said resonant inductor and said resonant capacitor is ensured so that an energy accumulated in said rectifier and smoothing circuit is returned to said full bridge circuit so as to act as equivalent as when said output current is increased and to increase the current flowing through said full bridge circuit.

* * * * *